United States Patent [19]

Misquitta

[11] Patent Number: 5,639,380
[45] Date of Patent: Jun. 17, 1997

[54] SYSTEM FOR AUTOMATING GROUNDWATER RECOVERY CONTROLLED BY MONITORING PARAMETERS IN MONITORING WELLS

[76] Inventor: Neale J. Misquitta, c/o McLaren/Hart, 8500 Brooktree Rd. Suite 300, Wexford, Pa. 15090

[21] Appl. No.: 251,281

[22] Filed: May 31, 1994

[51] Int. Cl.⁶ .............. B01D 17/12; E03B 3/12; B09B 3/00
[52] U.S. Cl. ............ 210/739; 166/53; 166/250.01; 175/24; 175/58; 210/143; 210/170; 210/747; 405/128; 588/260
[58] Field of Search .............. 166/53, 245, 250, 166/370, 250.01, 250.03; 210/85, 90, 96.1, 170, 416.1, 739, 741, 747; 364/422, 509, 510; 417/14, 44.2, 45; 405/128; 588/260; 175/24, 50, 58

[56] References Cited

U.S. PATENT DOCUMENTS

| | | | |
|---|---|---|---|
| Re. 33,102 | 10/1989 | Visser et al. | 166/267 |
| 4,085,798 | 4/1978 | Schweitzer et al. | 166/252 |
| 4,660,639 | 4/1987 | Visser et al. | 166/267 |
| 4,727,936 | 3/1988 | Mioduszewski et al. | 166/53 |
| 4,892,664 | 1/1990 | Miller | 210/747 |
| 4,926,942 | 5/1990 | Profrock | 166/370 |
| 4,934,458 | 6/1990 | Warburton et al. | 166/370 |
| 4,998,585 | 3/1991 | Newcomer et al. | 166/105 |
| 5,006,250 | 4/1991 | Roberts et al. | 210/610 |
| 5,099,920 | 3/1992 | Warburton et al. | 166/250 |
| 5,147,559 | 9/1992 | Brophey et al. | 210/744 |
| 5,180,013 | 1/1993 | Abdul | 166/370 |
| 5,186,255 | 2/1993 | Corey | 166/250 |
| 5,271,467 | 12/1993 | Lynch | 166/370 |
| 5,295,763 | 3/1994 | Stenborg et al. | 405/129 |
| 5,316,085 | 5/1994 | Dawson | 166/53 |
| 5,341,877 | 8/1994 | Abdul et al. | 166/53 |
| 5,468,088 | 11/1995 | Shoemaker et al. | 405/128 |

FOREIGN PATENT DOCUMENTS

| | | | |
|---|---|---|---|
| 1287085 | 1/1987 | U.S.S.R. | 364/422 |

*Primary Examiner*—Joseph W. Drodge
*Attorney, Agent, or Firm*—Craig M. Bell; Dann, Dorfman, Herrell & Skillman

[57] ABSTRACT

Method and system of operating an Intelligent Pump-and-Treat groundwater recovery system where the groundwater level is monitored in monitoring wells and that information transmitted to a computer controller. The computer controller calculates a new groundwater extraction flow rate required to maintain a desired capture zone and then automatically changes the flow rate of the groundwater extraction pump accordingly.

45 Claims, 14 Drawing Sheets

SYSTEM FOR AUTOMATING GROUNDWATER RECOVERY CONTROLLED BY MONITORING PARAMETERS IN MONITORING WELLS

BACKGROUND OF THE INVENTION

Field of the Invention

This invention relates to groundwater recovery systems, and more particularly to methods and systems for controlling and automating groundwater recovery.

Controlling groundwater contamination is a problem facing many communities today. When contaminants from a pollutant source contacts a groundwater aquifer, a groundwater contaminant plume is formed. This contaminant plume may migrate in the direction of the groundwater flow. In order to provide remediation of the groundwater aquifer and control migration of the contaminant plume, many environmental remediation programs today use a pump-and-treat operation. The cost of such an operation, however, can be quite high. In many cases, the pump-and-treat operation extends over many years thereby incurring—in addition to the initial construction costs—annual costs to maintain the system and pump and decontaminate the groundwater.

In a pump-and-treat operation, the migration of the contaminant plume is controlled by establishing a hydraulic barrier. This is accomplished by boring a well which penetrates into the groundwater aquifer and removing the contaminated groundwater for decontamination. To monitor the effectiveness of the remediation, contaminant concentrations are tested at monitoring wells and the results reported to regulatory agencies. These tests, however, can only determine if the contaminant concentrations are properly controlled at those sites at the time of the test. To comply with regulatory requirements, pump-and-treat sites may be required to monitor contaminant concentrations and/or water levels. In the vast majority of cases, this information is only utilized in a report showing groundwater levels, and on rare occasions, the capture zones, which is submitted to the required regulatory agencies.

Under the prevailing design approach to pump-and-treat programs, the establishment of a constant flow rate is of paramount importance. This flow rate is site specific and is calculated to capture the contaminant plume within a predetermined capture zone. Although a flow meter may be used in the groundwater extraction well to track the pumped water, transducers located in the groundwater extraction well, for instance, are not used since any information obtained from that location would be unreliable with respect to determining both groundwater levels, capture zones, and/or contaminant concentrations.

An aquifer, being a dynamic hydraulic system, is impacted by many variables such as changes in the saturated thickness, weather, impoundments and the presence of rivers and streams. Changes to these variables can lead to greatly changed pumping conditions—and thus the constant flow rate initially calculated may no longer be suitable. For instance, an increase in the groundwater level may lead to an under-pumping situation where using the predetermined constant pumping rate is insufficient to maintain the desired predetermined capture zone. This results in inadequate contaminant cleanup and compliance violations. Conversely, a drop in the groundwater level may lead to an over-pumping situation where using the predetermined constant pumping rate results in pumping out, treating and remediating more groundwater than necessary, thereby increasing operating costs.

These problems are evident at current sites using pump-and-treat systems. For instance, it is believed that only a handful out of approximately 2,000 federal sites using pump-and-treat systems have been successful; and that another 10,000 private sites are using this technique with varying degrees of success. These systems apparently do not work well, in part, due to over-pumping and/or under-pumping of the contaminated groundwater.

Although pumping rates may be adjusted in the early stages of treatment, pumping rates are not conventionally adjusted based on information obtained for regulatory compliance. If the information is used to adjust the pumping rate, it is conventionally obtained only long after conditions have changed and from locations away from the capture zone boundary. In addition, any changes based upon this information are manually implemented. As can be seen, the foregoing is a difficult and time consuming process, and fails to provide any means whereby a more dynamic response to changing conditions may be effectuated.

There is accordingly a need for a groundwater recovery system which provides a high degree of hydraulic control over the removal of the contaminant plume, is cost-effective, and more importantly, raises the confidence level that the pump-and-treat remediation operation is effective and in compliance with environmental regulations.

SUMMARY OF THE INVENTION

It is accordingly an object of the present invention to provide a new groundwater recovery system which provides a high degree of hydraulic control over the removal of the contaminant plume.

It is a further object of this present invention to achieve a higher confidence level in the effectiveness of the remediation program and of regulatory compliance.

It is a further object of the present invention to optimize the cost of remediation.

It is a further object of the present invention to reduce the time for remediation.

It is a further object of the present invention to provide automated long-term monitoring of remediation performance.

To achieve these objectives and in accordance with the purpose of the invention, as embodied and described herein, there is presented an Intelligent Pump-and-Treat control process and system (the "IPT Control Process") whereby a pump extracts groundwater from a well at a first flow rate, the hydrodynamics of the surrounding area are monitored, and the hydrodynamic information is transmitted to a computer controller, which computes a new second flow rate and automatically adjusts the pump to the second flow rate to maintain the desired capture zone.

These and other objects, aspects, features and advantages of the present invention will become apparent from the following detailed description taken in conjunction with the appended claims and accompanying drawings.

3

Figure 4:
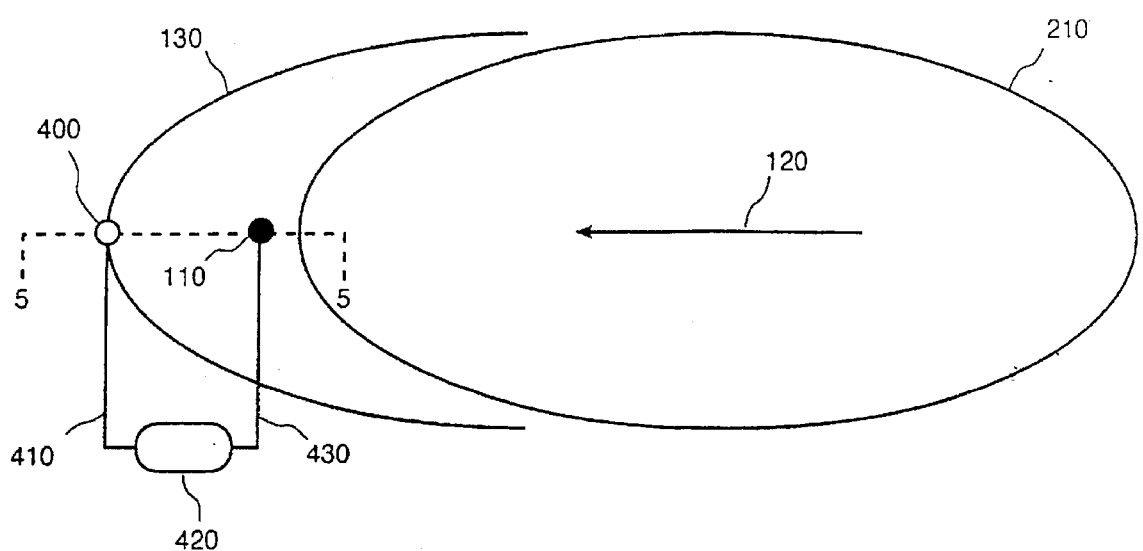
FIG. 4 illustrates an embodiment of a site utilizing this invention.
Figure 5:
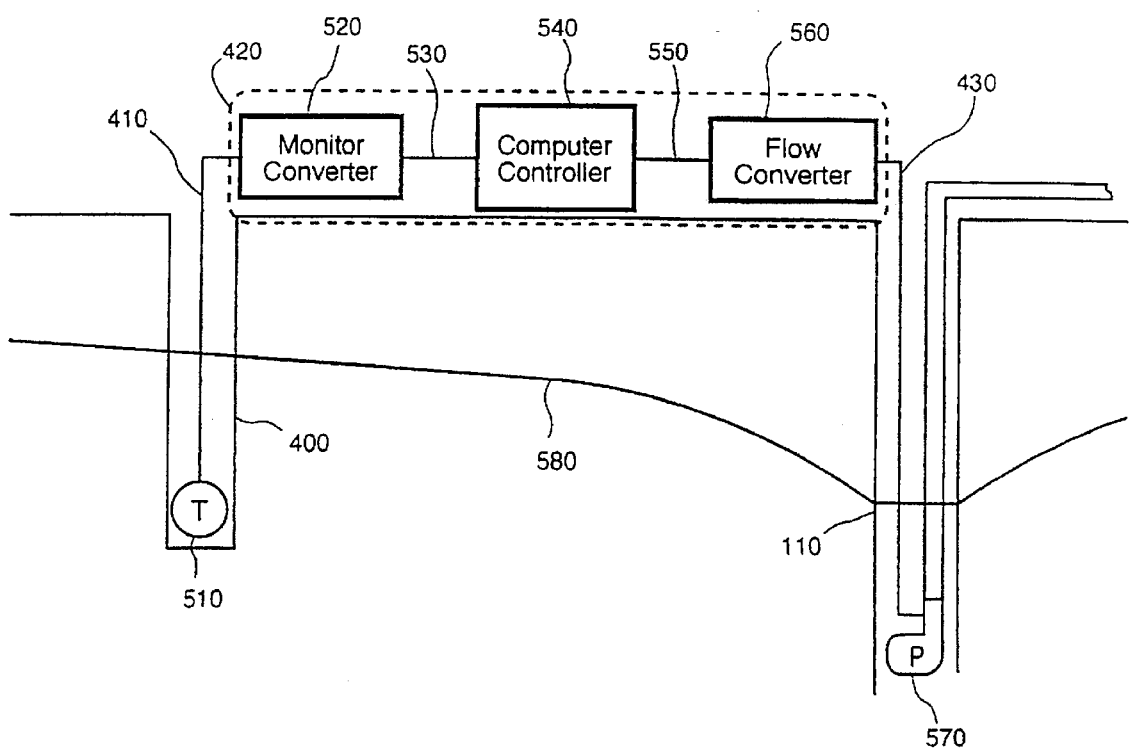
Figure 6:
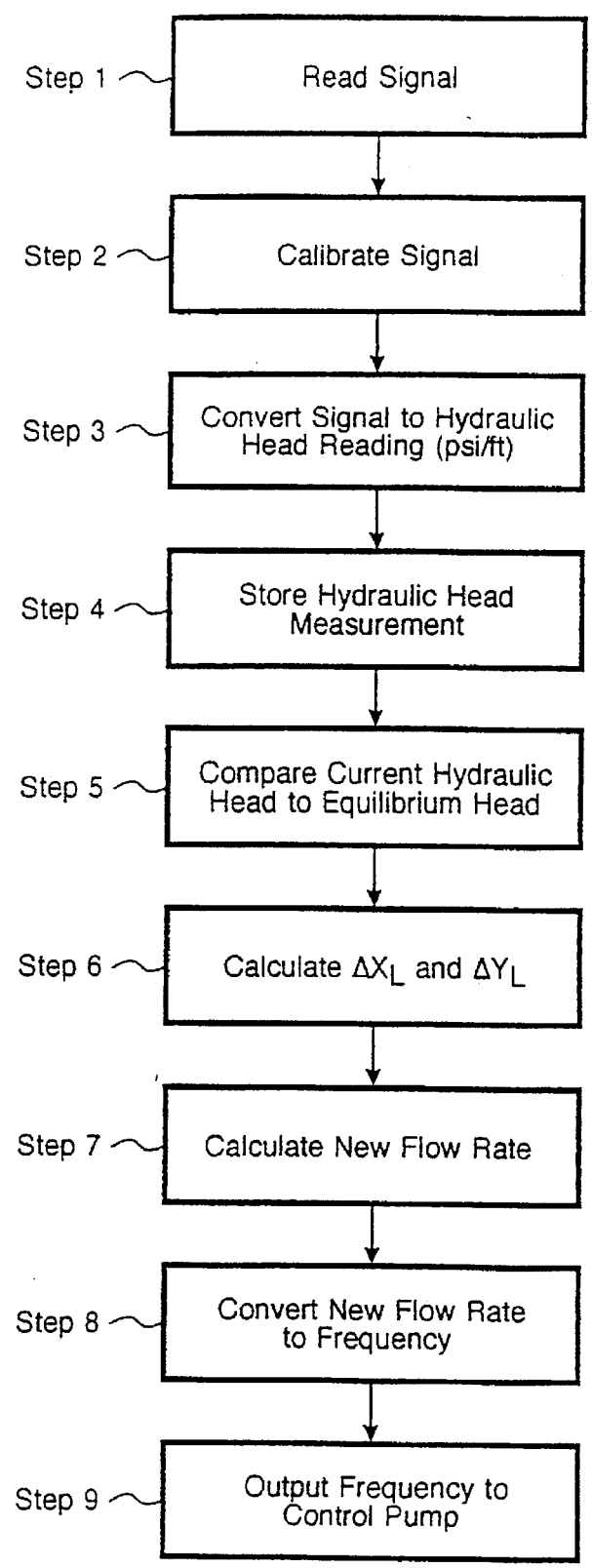
Figure 7:
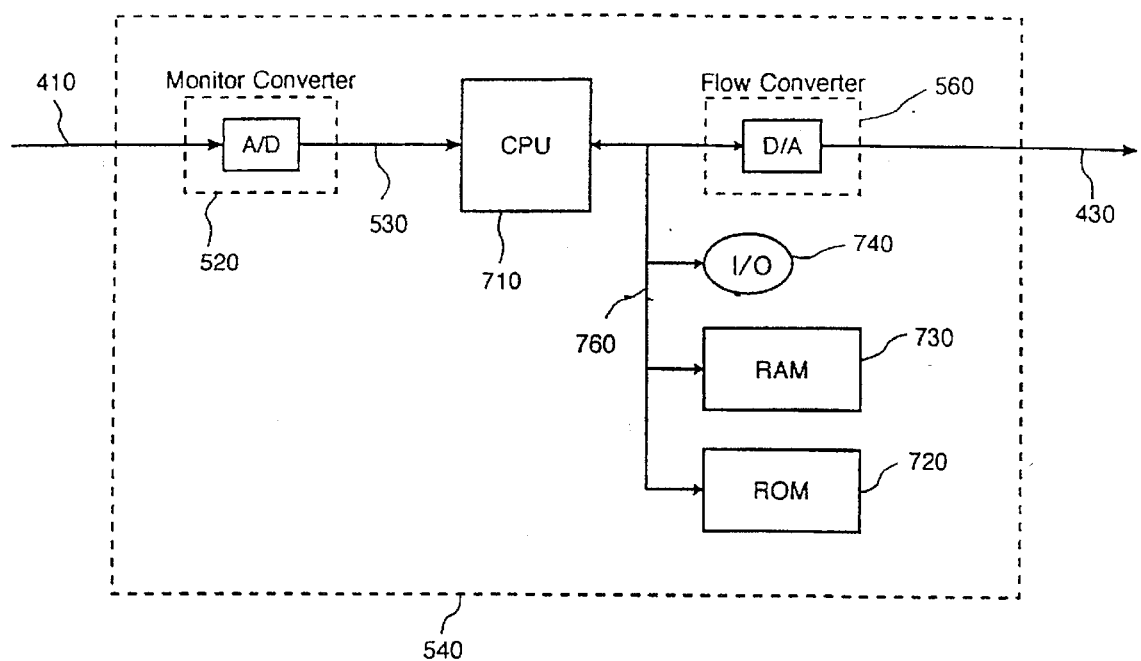
Figure 8:
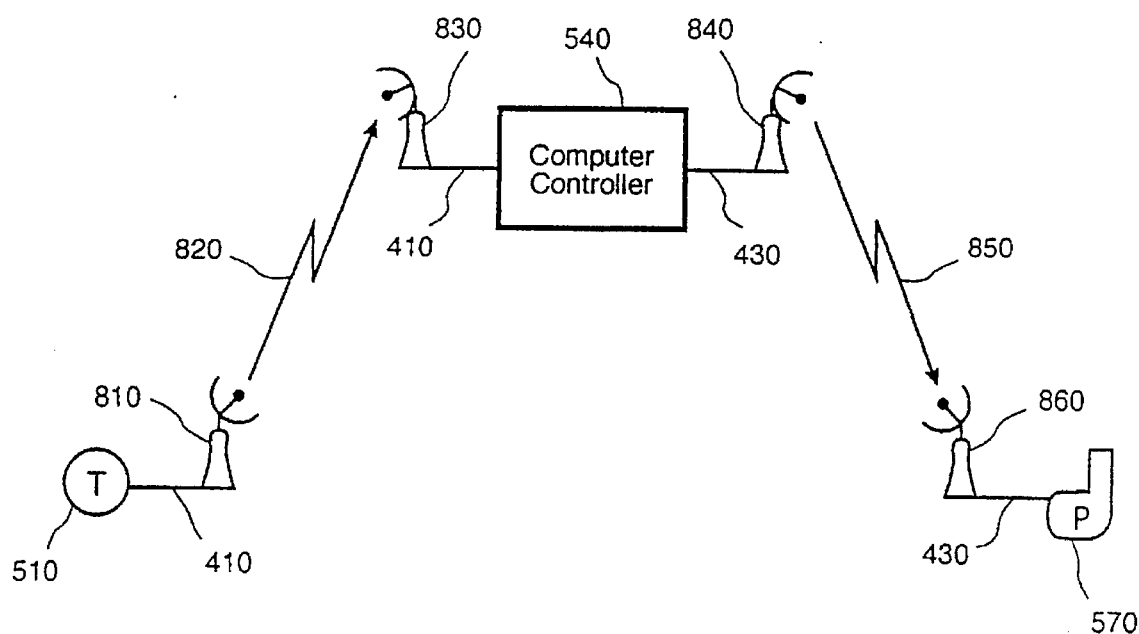
Figure 9:
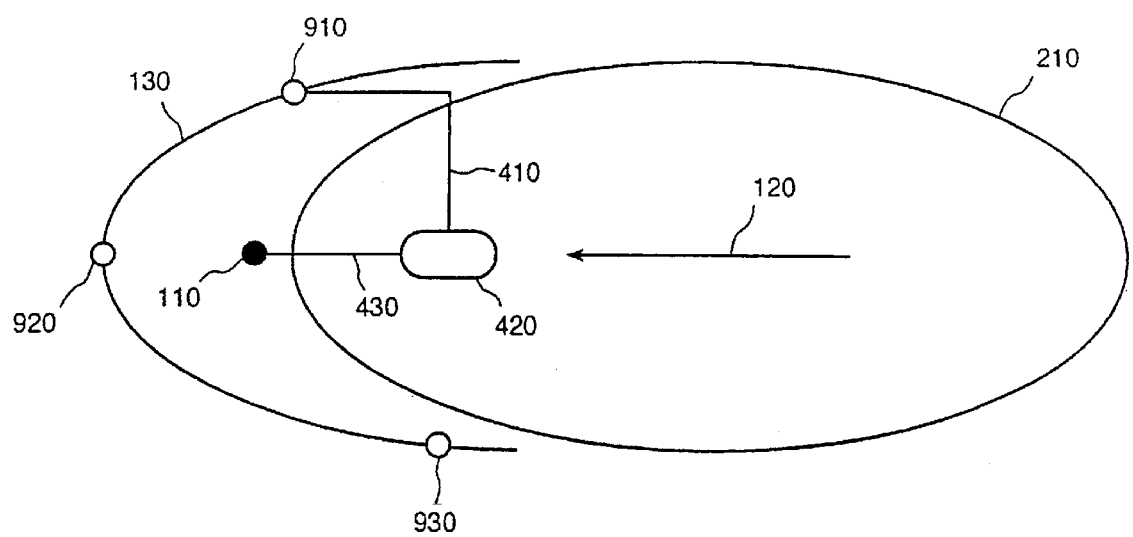
Figure 10:
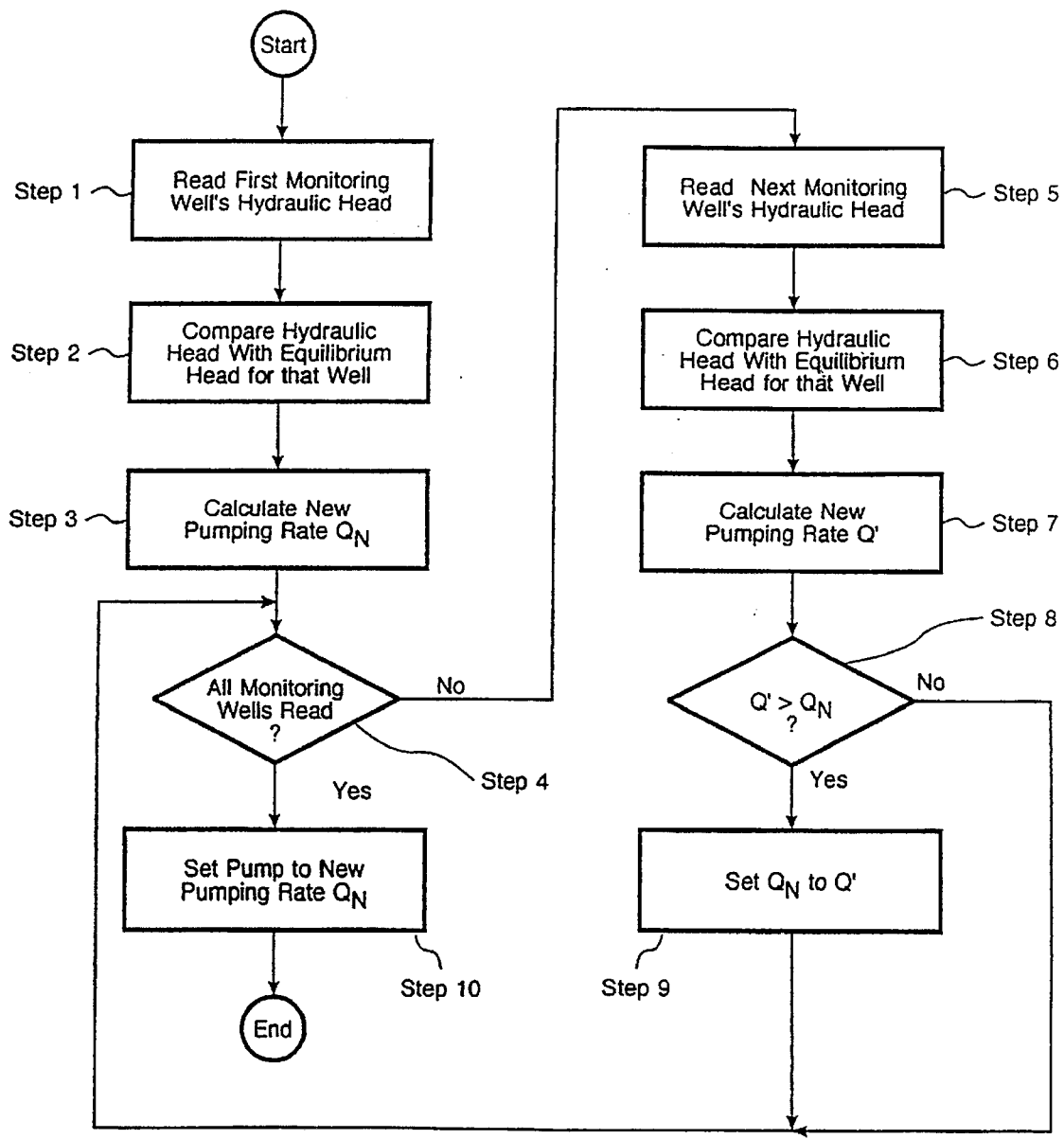
Figure 11:
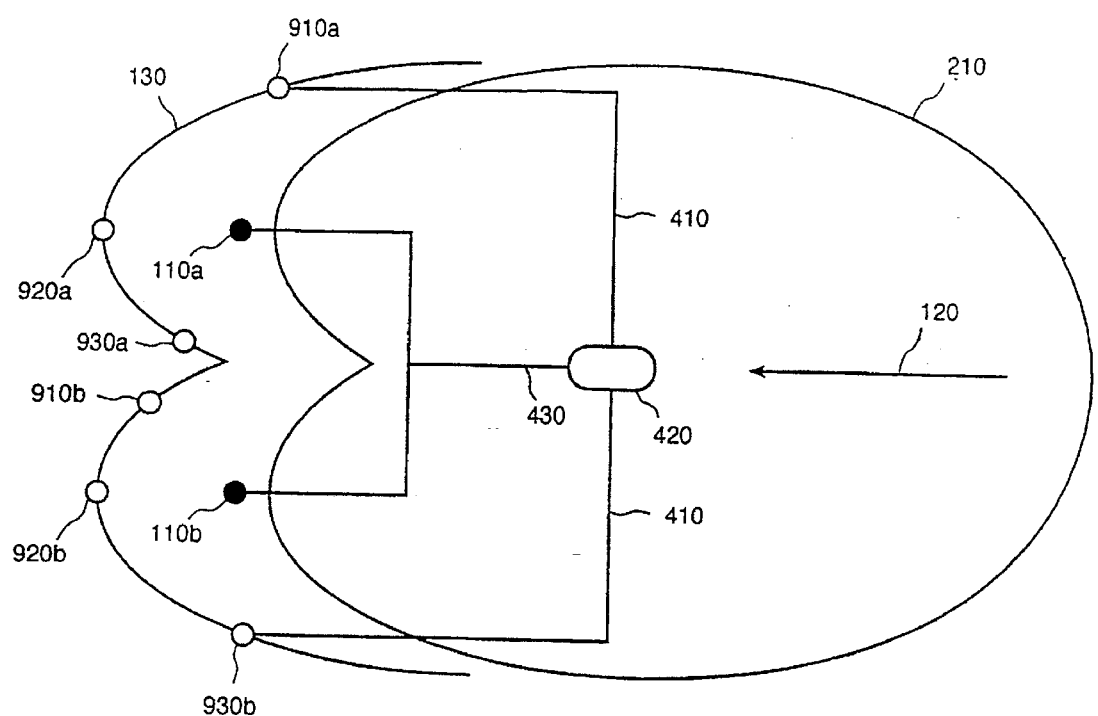
Figure 12:
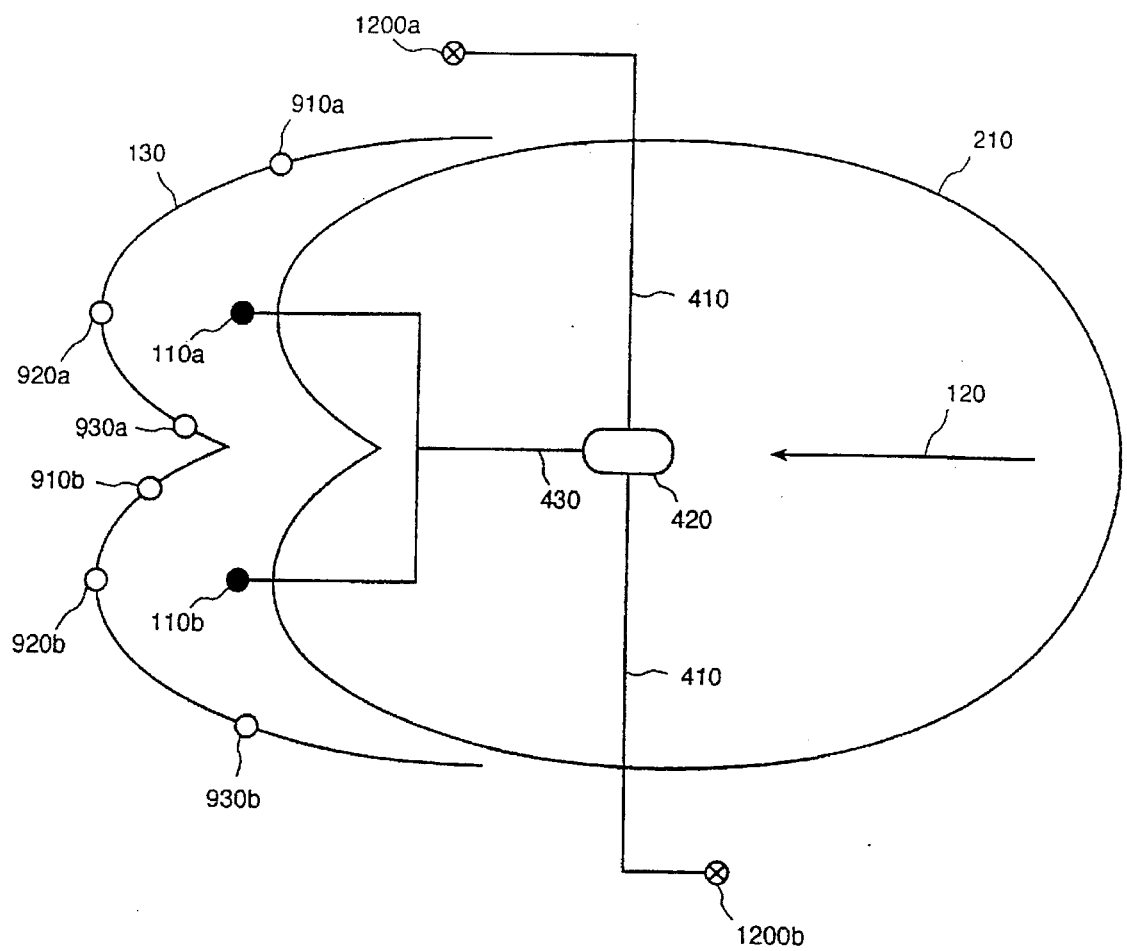
Figure 13:
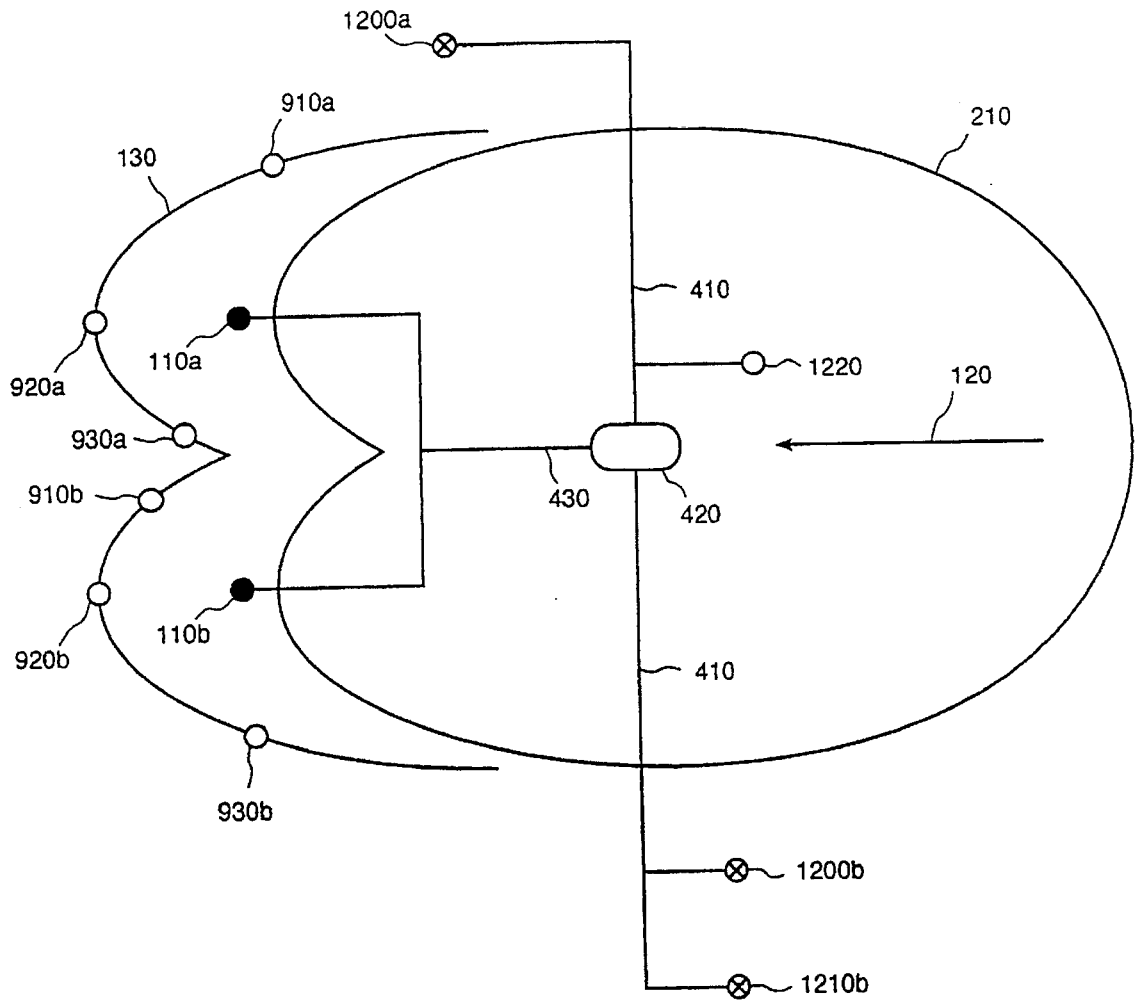

FIG. 5 is a plan view of the pump-and-treat system exemplified in FIG. 4 taken along line 5;

FIG. 6 is a flow chart illustrating the steps taken by the computer controller to control the pump-and-treat system;

FIG. 7 is a block diagram depicting an embodiment of the computer controller;

FIG. 8 is a block diagram depicting the use of wireless transmission of signals;

FIG. 9 illustrates a pump-and-treat site utilizing multiple monitoring wells;

FIG. 10 is a flow chart illustrating the steps taken to control a pump-and-treat system with multiple monitoring wells;

FIG. 11 illustrates a site utilizing multiple groundwater extraction wells and multiple monitoring wells;

FIG. 12 illustrates a site utilizing multiple groundwater extraction wells, multiple monitoring wells and a reference well for associated monitoring wells; and FIG. 13 illustrates a site utilizing multiple groundwater extraction wells, multiple monitoring wells and multiple reference wells for associated monitoring wells.

DESCRIPTION OF THE PREFERRED EMBODIMENTS

A detailed description of the preferred embodiments of the invention, examples of which are illustrated in the accompanying drawings, will now be provided. Wherever possible, the same reference numbers will be used throughout the drawings to refer to the same or like elements.

Basic Aquifer Capture Zone Hydraulics

Figure 1:
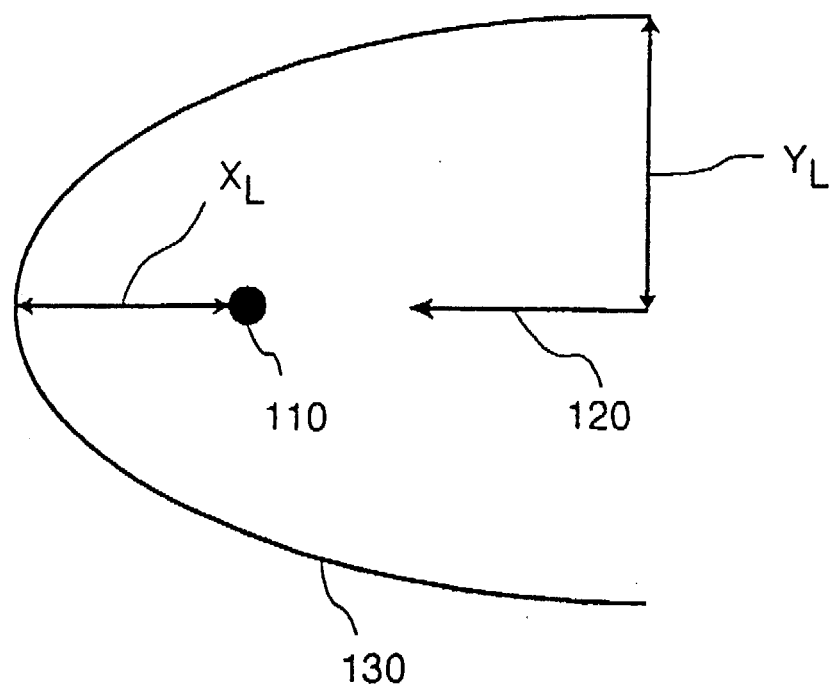
FIG. 1 illustrates the basic parameters of a capture zone.

FIG. 1 shows a planar view of the groundwater capture zone of a theoretical groundwater flow regime. Groundwater extraction well 110 is placed in an aquifer and groundwater pumped out at a pumping/flow rate Q. Flow line 120 indicates the direction of groundwater flow. The boundary of capture zone 130 shows the extent wherein a contaminant plume located within capture zone 130 is contained and removed via groundwater extraction well 110.

The extent of capture zone 130 can be defined by two variables, $X_L$ and $Y_L$, which respectively represent the downgradient and sidegradient extent of capture zone 130. $X_L$ and $Y_L$ are determined based upon the dimension of the contaminant plume. For a pump-and-treat operation to be successful and cost-effective, $X_L$ and $Y_L$ should be the minimal size needed to contain the contaminant plume and be maintained constant for the duration of the remediation program.

An aquifer, however, is not a static system. Rather, an aquifer is dynamic and the parameters defining an aquifer are likewise dynamic. The two most dynamic parameters of an aquifer are its hydraulic gradient (i), which is the measure of the difference in hydraulic head between two points, and its transmissivity (T), which is the measure of the amount of water that can be horizontally transmitted through the saturated thickness of the aquifer under a given hydraulic gradient. These parameters relate to $X_L$ and $Y_L$ as indicated in the following equations:

Equation 1: $X_L = \dfrac{Q}{2\pi T i}$

Equation 2: $Y_L = \dfrac{Q}{2Ti}$ where Q is the pumping rate, T is the transmissivity, and i is the hydraulic gradient. Rewriting Equations 1 and 2 to solve for Q gives:

4

Equation 3: $Q = X_L 2\pi T i$

Equation 4: $Q = Y_L 2 T i$

Figure 2A:
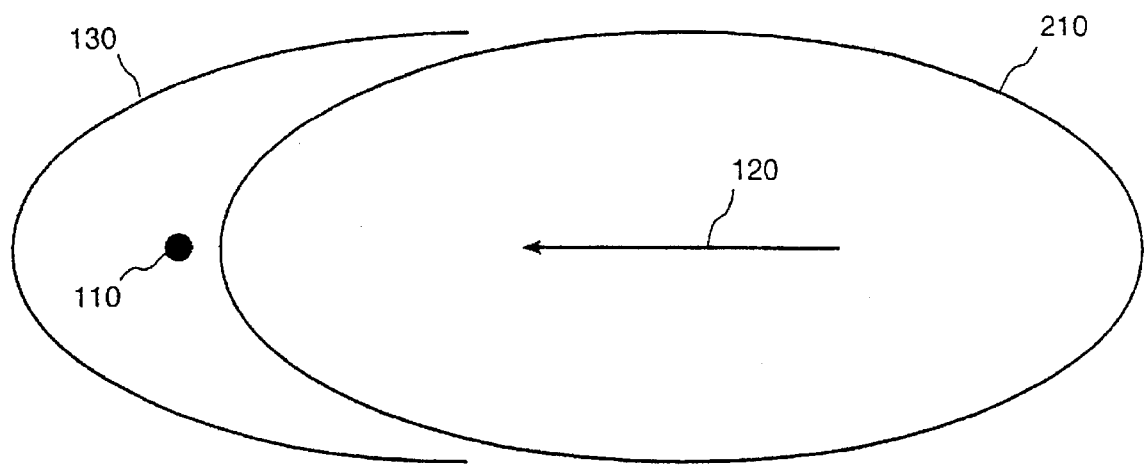
FIG. 2a illustrates an aquifer in a stable hydraulic condition.

FIG. 2a shows an example of an ideal homogenous aquifer system under stable hydraulic conditions. As shown, contaminant plume 210 is flowing in the direction of flow line 120. For exemplification, if the aquifer's transmissivity T is 200 gpd/ft (gallons per day per foot), its hydraulic gradient is 0.01, the desired capture zone extent for $X_L$ is 1,146 feet and for $Y_L$ is 3,600 feet, application of Equations 3 and 4 yields the required groundwater pumping rate to maintain the desired capture zone to be 10 gpm (gallons per minute).

I. Changes in Transmissivity

A. Aquifer Recharge

Figure 2B:
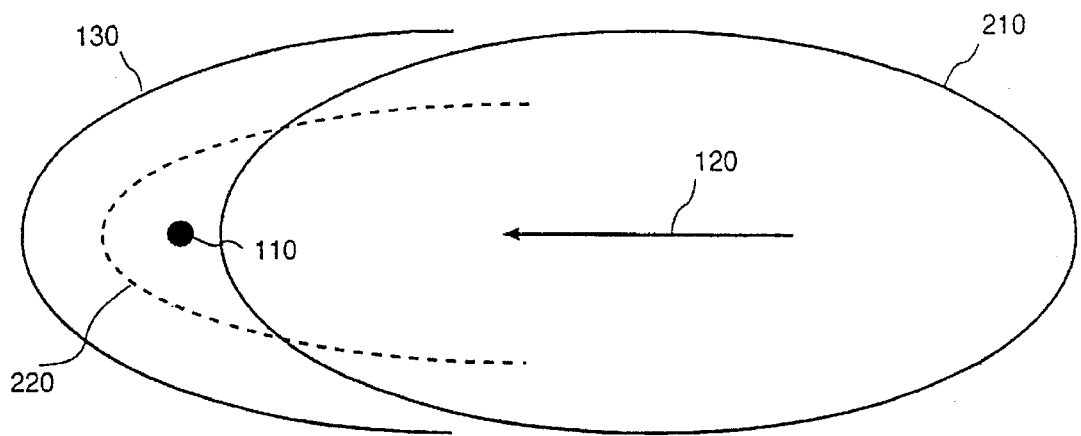
FIG. 2b illustrates an aquifer under a recharge condition.

During aquifer recharge, the saturated thickness of an aquifer increases, thereby increasing the aquifer's transmissivity. This situation is depicted in FIG. 2b for the ideal homogenous aquifer shown in FIG. 2a. Assume, for illustration purposes only, that the groundwater level rises 20 percent due to recharge, and consequently the aquifer transmissivity increases by a like percentage from 200 gpd/ft to 240 gpd/ft.

Since the pumping rate is maintained at 10 gpm, the increased aquifer transmissivity leads to an underpumping situation causing the extent of the desired predetermined capture zone 130 to be reduced to that indicated by reduced capture zone 220. This leads to incomplete contamination cleanup and regulatory violations—and subsequent failure of the pump-and-treat operation to achieve its remedial objectives.

To remedy the under-pumping situation, the pumping rate must be increased. Under the conditions where given $X_L=1,146$ feet, $Y_L=3,600$ feet, T=240 gpd/ft and i=0.01, application of Equations 3 and 4 yields a new pumping rate of 12 gpm, which, if used, would maintain the desired capture zone extent under the above given conditions.

B. Aquifer Discharge

Figure 2C:
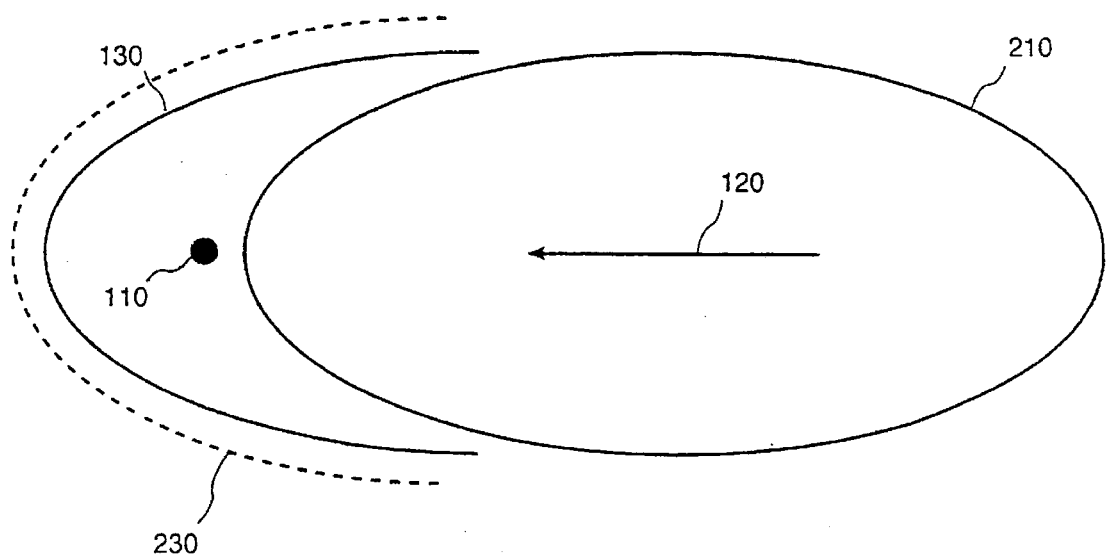
FIG. 2c illustrates an aquifer under a discharge condition.

The converse situation of aquifer discharge, shown in FIG. 2c, is analogous to the recharge situation described above. For example, if the saturated thickness of the aquifer decreases 20 percent from the stable hydraulic condition shown in FIG. 2a due to seasonal fluctuations, the transmissivity, for illustrative purposes only, decreases by a like percentage from 200 gpd/ft to 160 gpd/ft.

Since the pumping rate is maintained at 10 gpm, the decreased aquifer transmissivity leads to an over-pumping situation causing the extent of the original capture zone 130 to expand to that indicated by increased capture zone 230. Although not as serious a problem as under-pumping, the pump-and-treat operation is now pumping—and treating—more water than necessary, thereby increasing the cost of the remedial operation.

To remedy the over-pumping situation, the pumping rate must be decreased. Application of Equations 3 and 4 by substituting $X_L=1,146$ feet, $Y_L=3,600$ feet, T=160 gpd/ft and i=0.01 yields a new pumping rate of 8 gpm which, if used, would maintain the desired capture zone under the above given conditions and decrease operating costs by not having to treat the 2 gpm difference.

II. Changes in Hydraulic Gradient

A second important parameter affecting the capture zone in an aquifer system is the hydraulic gradient. This parameter is critical where aquifers are hydraulically connected to surface waters bodies, such as streams, lakes, rivers and surface impoundments, which show rapid response to outside influences (for example, precipitation recharge).

Changes in the hydraulic gradient impact the capture zone in a manner similar to that illustrated above for changes in transmissivity—with a corresponding impact to the remedial success and cost of the pump-and-treat operation.

The inventor has determined that due to the dynamic and turbulent conditions found in the groundwater extraction well, the water level in the groundwater extraction well necessarily fails to provide an adequate indicator of local or regional water levels, transmissivity or hydraulic gradient under any real-life conditions. Also, the inventor has determined that due to factors such as oxidation and/or aeration caused by cavitation, contaminant concentrations cannot be adequately determined within the groundwater extraction well. Consequently, the extent of the capture zone cannot be determined from the water level in the groundwater extraction well and thus objectives such as raising the confidence level of effective remediation and regulatory compliance, and optimizing costs cannot be achieved.

Figure 3:
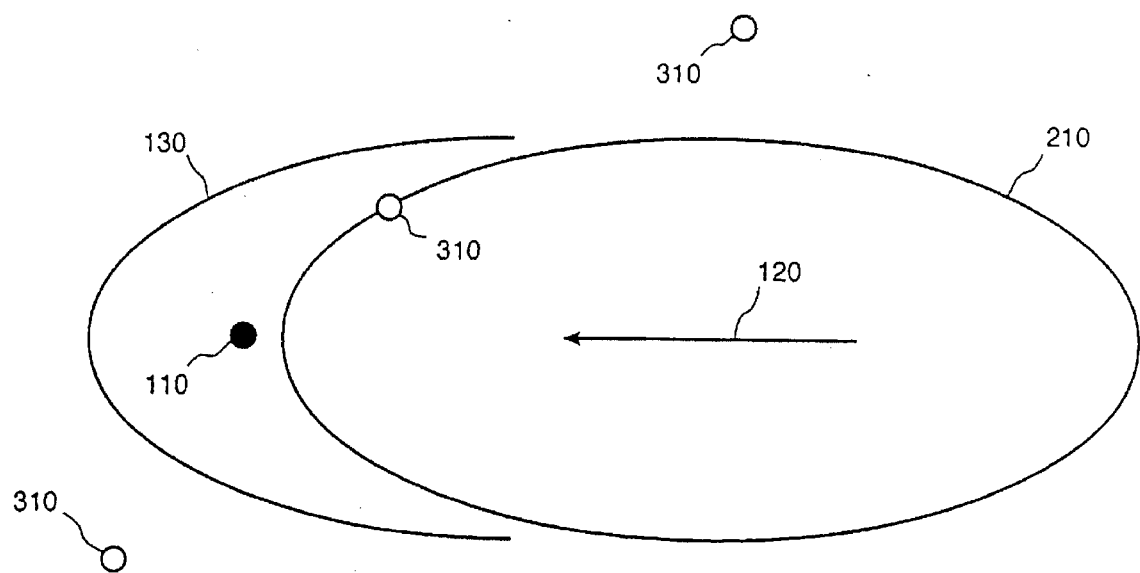
FIG. 3 illustrates a prior art pump-and-treat site.

FIG. 3 shows a prior art site with monitoring wells 310 (indicated by the open circles) in various locations. The choice of locations for these wells may be arbitrary in some instances, or may, in other cases, be determined after a study of a particular site. One facility, for example, may study the remedial site in the following manner.

First, a site investigation is conducted where the air, soil and groundwater are tested to determine if a contamination problem exists. This investigation can take approximately one to two years.

If a problem is determined to exist, then the extent of contamination in each individual media is identified. This can take upwards of one year. During this time, the risks associated with these contaminants may be assessed by quantifying the concentration of contaminants which is considered an acceptable risk. Many factors are taken into account in making this assessment, including the site characteristics and the nature of the contaminants. The results may include, for instance, the identification of the boundary of the contaminant plume, i.e., the area above the acceptable risks.

In this example, Points-of-Compliance (POC) are now defined and selected as points where the contaminant concentration cannot be above the acceptable risks and/or regulatory agencies' defined limits. Of course, other methods of defining and selecting these compliance points may be used, such as arbitrarily selecting points on the boundary of the facility as the compliance points. Typically, these compliance points are located off the capture zone boundary, though occasionally have been located on the boundary of the contaminant plume. In the IPT Control Process, these compliance points include the boundary of the desired capture zone.

Next, a plan for cleaning up the site is proposed, taking into account the state-of-the-art, nature of contaminants and costs. In addition, this plan identifies any additional data which needs to be obtained, for example, the transmissivity and hydraulic gradient, and recommends technologies appropriate to the contaminated media. The selected technology is then submitted to the proper regulatory agencies for approval.

Next, tests are conducted to determine the characteristics of the site and to fill in any previously identified data gaps. In the case of groundwater contamination, a test groundwater extraction well is installed along with four to six monitoring wells in order to perform an aquifer pumping test. If the site is relatively homogeneous, this test setup may be located outside the contaminated area. If the site is nonhomogeneous or complex, then the setup may be located within the contaminated area. During the aquifer pumping test, groundwater is extracted and these monitoring wells used to characterize the site parameters such as transmissivity and hydraulic gradient, extent of the cone of depression, groundwater levels and contaminant concentrations.

Based on the transmissivity and hydraulic gradient, a pumping rate and desired capture zone extent is established to create a cone of depression commensurate with the downstream boundary of the contaminant plume. In prior art systems, this pumping rate was then increased to a larger constant pumping rate value in an attempt to provide some degree of confidence that the system will continue to capture the contaminant plume during aquifer recharge situations.

In the IPT Control Process, additional data may also be collected during aquifer testing which includes creating an equilibrium database of equilibrium data. This data may consist, for instance, of the equilibrium hydraulic head quantified as the groundwater elevation for the aquifer. Given the natural fluctuations in the aquifer's groundwater level in response, for example, to seasonal or weather variations, the equilibrium database describes the aquifer's fluctuating equilibrium state in a given well over a period of time. This information permits the system to dynamically and intelligently adjust its response to external conditions.

FIG. 4 depicts a preferred embodiment to exemplify one aspect of the IPT Control Process. As can be seen, monitoring well 400 is operatively connected to groundwater extraction well 110 through controller 420, and is placed on the boundary of the desired capture zone, and thus on a point-of-compliance.

In some situations, such placement may not be practical since the desired capture zone boundary may, for instance, not be clearly delineated and can only be defined to within a certain confidence level. In this case, the monitoring wells are placed proximate to this capture zone boundary and treated as being on the capture zone boundary. Similarly, where the capture zone partly extends under a building, monitoring wells are proximately placed as close as practicable to this capture zone boundary and treated as if on the capture zone boundary.

FIG. 5 shows a block diagram of the site in FIG. 4 along line 5. Although only one monitoring well 400 and one groundwater extraction well 110 is shown and described at this time, it is understood that the method and system is applicable to the use of multiple wells.

Monitoring device 510 is placed within monitoring well 400 to measure conditions within that well. Such information may, for example, represent groundwater parameters such as the groundwater level or contaminant concentration located within the monitoring well. The information is transmitted as condition signal 410 to monitor converter 520 which converts condition signal 410 into digital signal 530. Computer controller 540 receives digital signal 530, and, in response to that signal, transmits flow signal 550 to flow converter 560, which converts flow signal 550 into control signal 430. Control signal 430 is transmitted to pump 570 located in groundwater extraction well 110 and varies the pumping rate of pump 570. Line 580 indicates the groundwater level in the aquifer.

In one embodiment, monitoring device 510 is a pressure transducer which is responsive to the water pressure above the transducer. The pressure transducer outputs condition signal 410, which is an analog signal proportional to the hydrostatic pressure above the transducer, to monitor converter 520. The transducer receives as an input 0 to 20 volts DC and, depending on the hydrostatic pressure above the transducer, outputs a 4 to 20 ma analog signal. Other types of devices known in the art may of course be used for monitoring device 510 and are not limited to pressure transducers, but may include, for instance, probes which measure the contaminant concentration, particularly the chemical contaminant concentration of the groundwater within monitoring well 400.

Monitor converter 520 converts analog condition signal 410 into digital signal 530. This is accomplished preferably by using a 10-bit resolution analog-to-digital converter which takes analog condition signal 410 and converts it into digital signal 530 with a value between 0 and 1023.

Computer controller 540 receives digital signal 530 for processing to compute the new flow rate needed to maintain the desired capture zone 130. Computer controller 540 subsequently converts the newly calculated flow rate into digital flow signal 550.

Flow converter 560 receives digital flow signal 550 and converts it into analog control signal 430, via a 10-bit resolution digital-to-analog converter, compatible with pump 570. Pump 570 responds to control signal 430 by changing its pumping rate.

Pump 570, in this embodiment, is a submersible frequency controlled pump. For example, the output flow rate of pump 570 may vary from 0 to 40 gpm depending on the frequency of control signal 430, which may range from 0 to 400 Hz. Control signal 430, in this embodiment, is a sinusoidal-like signal which controls the pumping rate of pump 570. It is understood that other schemes for controlling the flow rate may be used, such as the use of a submersible voltage controlled pump, and is not limited to the use of a submersible frequency controlled pump.

The process by which computer controller 540 calculates a new flow rate will now be described with reference to FIG. 6. Digital signal 530 from monitor converter 520 is read by computer controller 540 (Step 1) and calibrated in accordance with specific transducer parameters (Step 2). For instance, digital signal 530 may have to be scaled, have an offset added and possibly transformed to adjust for the characteristics of a specific transducer.

The calibrated digital signal is next converted from a number representing the water pressure above monitoring device 510 to the current hydraulic head of monitoring well 400 (Step 3) and stored in a database (Step 4) along with other parameters like the time, date and well number. This database permits the subsequent analysis of the remedial program's performance over extended periods of time. In addition, the data may be quickly tabulated and reported to various regulatory agencies, saving time as well as providing more accurate and timely information.

Once the current hydraulic head is determined, this is compared to the predetermined equilibrium hydraulic head stored in computer controller 540 (Step 5), to yield the difference in the extent of the current capture zone and the extent of the desired capture zone (Step 6). As an example, the equilibrium database may indicate that the equilibrium head for monitoring well 400 is one value during the month of July. This value is then used as the equilibrium head in Step 5 during the month of July. Likewise, the database may indicate that the equilibrium head for monitoring well 400 is another value for the month of December, and is accordingly used as the equilibrium head during the month of December in Step 5. Computer controller 540 can then use these values to calculate $\Delta X_L$ and $\Delta Y_L$, which represents the difference between the current zone extent and the desired capture zone extent (Step 6).

Based on $\Delta X_L$ and $\Delta Y_L$, computer controller 540 then calculates, using Equations 3 and 4, the new flow rate needed to maintain the desired $X_L$ and $Y_L$ (Step 7). In the preferred embodiment, the new flow rate is subsequently converted by flow converter 560 into a frequency control signal 430 representing that new flow rate (Step 8) and output to pump 570 (Step 9). Pump 570, upon receiving the control signal, modifies its pumping rate accordingly. The result is to adjust the hydraulic head in monitoring well 400 to that of the equilibrium head, via the pumping rate. Of course, other pumping methods for controlling the removal rate of the contaminated groundwater by pumping are contemplated, such as the simple method where a constant output pump is periodically switched on and off, thereby varying the removal rate from the well.

In another preferred embodiment, shown in FIG. 7, computer controller 540 incorporates monitor converter 520 and flow converter 560. Preferably, CPU 710, such as a Motorola 68HC111, is connected via bus 760 to 32K ROM 720 for program storage, 128K RAM 730 for data storage, interface logic 740 to communicate with another computer, and flow converter 560.

In yet another embodiment, shown in FIG. 8, condition signal 410 from monitoring device 510 is transmitted by wireless means, such as radio waves, to computer controller 540. Likewise, control signal 430 from computer controller 540 is transmitted by radio waves to pump 570. This embodiment is useful in sites where the terrain or cost mitigates against the use of laying down signal runs, for instance, electrical or optical, and thus permits the use of this invention under these constraints.

In particular, condition signal 410 is received by transmitter 810 and transmitted wirelessly, in a form such as by radio waves 820, to receiver 830. Receiver 830 converts the radio waves 820 back to condition signal 410 to be transmitted by wire to computer controller 540. After computer controller 540 calculates the new flow rate, it sends control signal 430 to transmitter 840 which transmits the signal wirelessly, in a form such as by radio waves 850, to receiver 860. Receiver 860 converts radio waves 850 back to control signal 430 and transmits control signal 430 to pump 570, which responds by changing its pumping rate.

FIG. 9 illustrates a more preferred embodiment utilizing multiple monitoring wells 910, 920 and 930 placed at the points-of-compliance located on the boundary of desired capture zone 130, although where such placement is not practical, the one or more pumps may be placed proximate to the capture zone boundary, as described above. For the sake of clarity, only monitoring well 910 is shown connected to controller 420 via condition signal 410, although it is to be understood that monitoring wells 920 and 930 are also connected to controller 420 in this manner.

In the IPT Control Process, the overriding goal is to protect the points-of-compliance, and thus to maintain the extent of the desired capture zone. This is achieved by calculating for each monitoring well a new pumping rate based only, for instance, on the hydraulic head for that monitoring well. The maximum among the set of newly calculated pumping rates is selected and used as the new pumping rate for the system. This methodology ensures complete contaminant capture since under-pumping is avoided. Moreover, costs are optimized since the lowest pumping rate needed to contain the contaminant plume is used. It is understood that adjustments to the pumping rate may be made as frequently as needed to provide the desired level of control.

Reference will now be made to FIG. 10 in describing in greater detail one embodiment of the decision process as just described.

The hydraulic head is obtained for the first monitoring well 910 (Step 1). This is compared with the equilibrium head for that well (Step 2) and a new pumping rate $Q_N$ calculated (Step 3).

If there are additional monitoring wells to be processed (Step 4), then the hydraulic head for the next monitoring well (monitoring well 920 in this example) is obtained (Step 5) and compared to the equilibrium head reading for that monitoring well (Step 6) and a pumping rate Q' calculated (Step 7). If the pumping rate Q' is greater than $Q_N$ (Step 8), then the new pumping rate $Q_N$ is set to Q' (Step 9). Process Steps 4–9 are repeated for the remaining monitoring wells (only monitoring well 930 in this example).

When all monitoring wells have been processed, $Q_N$ is the maximum of the newly calculated pumping rates. The pump located in groundwater extraction well 110 is then set to the new pumping rate $Q_N$ (Step 10). This methodology ensures that the contaminant plume is contained by selecting the maximum of the newly calculated pumping rates, and optimizes operation since $Q_N$ may be smaller than the previously set pumping rate. It is to be understood that other methods of computing a new pumping rate may be used depending on the site and desired control.

Reference is now made to FIG. 11 exemplifying a yet more preferable embodiment. In this embodiment, multiple groundwater extraction wells 110a and 110b are used to more precisely control contaminant plume 210. Associated with groundwater extraction wells 110a and 110b are monitoring wells 910a–930a and 910b–930b, respectively. For purposes of clarity, only monitoring wells 910a and 930b are connected to controller 420 via condition signal 410 although it is to be understood that the other monitoring wells are also connected in this manner.

As with the embodiment shown in FIG. 9, the overriding goal is to protect the points-of-compliance. To accomplish this, the method set forth in FIG. 10 is also applicable to this embodiment.

In particular, the maximum among the newly calculated pumping rates is determined in accordance with the hydraulic head present in monitoring wells 910a–930a and the pump in groundwater extraction well 110a is adjusted to that new rate. Likewise, a new pumping rate is calculated for groundwater extraction well 110b based upon the hydraulic head present in its associated monitoring wells 910b–930b.

Reference is now made to FIG. 12 exemplifying a yet more preferred embodiment. FIG. 12 shows groundwater extraction well 110a and 110b along with their associated monitoring wells 910a–930a and 910b–930b, respectively. Reference wells 1200a and 1200b are associated with monitoring wells 910a–930a and 910b–930b, respectively. For purposes of clarity, only reference wells 1200a and 1200b are shown connected to controller 420 via condition signal 410, although it is understood that the monitoring wells are also connected in this manner.

Reference wells 1200a and 1200b are located in an area substantially free from the influences of the capture zone created by the pumps located in groundwater extraction wells 110a and 110b. Monitoring devices, such as monitoring device 510, are placed within each reference well to measure conditions within that well. These reference wells provide an alternative method by which the system can compare the current hydraulic head in an associated monitoring well with an equilibrium head (e.g., FIG. 6, Step 5 and FIG. 10 Steps 2 and 6).

Specifically, in the previous embodiments, the current hydraulic head was compared to an equilibrium head obtained from a database for a particular monitoring well at a particular point in time. In contrast, in this embodiment the current hydraulic head within the reference well is used as the equilibrium head for its associated monitoring wells rather than from a database comprised of historical equilibrium hydraulic head values.

Reference is now made to FIG. 13 exemplifying a yet more preferred embodiment. This embodiment adds to the embodiment of FIG. 12, reference well 1210b connected to controller 420 via condition signal 410, thereby associating multiple reference wells (1200b and 1210b) with monitoring wells 910b–930b.

In contrast to the embodiment shown in FIG. 12 where only the hydraulic head from reference well 1200b was used as the equilibrium head for monitoring wells 910b–930b, in this embodiment the hydraulic head from reference wells 1200b and 1210b are used to compute an equilibrium head for those monitoring wells. For instance, the maximum hydraulic head reading from the reference wells may be used as the equilibrium head or the average of their respective hydraulic head reading may be used as the equilibrium head.

As is apparent, the use of reference wells in the embodiments set forth in FIGS. 12 and 13 provides for increased accuracy in calculating the new pumping rates and provides better response to changes in hydraulic conditions due to more accurate, up-to-date information provided by the reference wells. As a consequence, the use of reference wells further increases the confidence level of contaminant containment and further optimizes operations.

FIG. 13 also shows monitoring well 1220 connected to controller 420 via condition signal 410, where monitoring well 1220 is located, in this instance, off the boundary of capture zone 130 and in the contaminant plume upstream of groundwater extraction wells 110a and 110b. Monitoring well 1220 provides in the IPT Control Process additional hydraulic data useful in providing a better understanding of the site. This data may be used, for instance, to generate a graphical display of the hydrodynamics of the site. It is to be understood that multiple monitoring wells located throughout the site may be used to provide such additional information and the use of such monitoring wells may be applied to any of the foregoing embodiments.

As is apparent from the description of the above pump-and-treat system and method of operation, practicing the method of using a computer controller to automatically direct the collection and processing of data, as well as to automatically control the groundwater extraction pump provides numerous of advantages over prior systems. Most importantly, the use of this invention enables the pump-and-treat operation to achieve a higher confidence level of regulatory compliance by compensating for constantly varying hydrodynamics of the treatment site, thereby reducing, if not eliminating, the number of incidences of under-pumping and compliance violations; achieves significant cost savings by not having to treat excess uncontaminated groundwater and/or decreasing the chances of getting regulatory fines due to noncompliance; reduces the amount of over-design of a pump-and-treat system; and provides long term performance monitoring of remediation performance.

What is claimed is:

1. A groundwater recovery system for recovering contaminated groundwater from an aquifer comprising:

a groundwater extraction well for providing access to contaminated groundwater in an aquifer;

a variable flow rate pump arranged for removal of contaminated groundwater from the groundwater extraction well;

a monitoring well for providing access to the aquifer, where the monitoring well is spaced from the groundwater extraction well there being no pump located to pump fluid from the monitoring well;

a monitoring device for measuring groundwater parameters within the monitoring well and located therein; and a controller connected to the monitoring device and the pump for calculating a flow rate for the pump to remove the contaminated groundwater based on signals received from the monitoring device, and for controlling the flow rate of the pump in accordance with the calculated flow rate.

2. A groundwater recovery system according to claim 1 wherein the monitoring well is located proximate to the boundary of a predetermined capture zone.

3. A groundwater recovery system according to claim 1 wherein the monitoring device measures a water pressure above the monitoring device.

4. A groundwater recovery system according to claim 1 wherein the monitoring device measures a contaminant concentration within the monitoring well.

5. A groundwater recovery system according to claim 1 wherein the variable flow rate pump is a frequency controlled pump.

6. A groundwater recovery system according to claim 1 wherein the variable flow rate pump is a voltage controlled pump.

7. A groundwater recovery system for recovering contaminated groundwater from an aquifer comprising:

a groundwater extraction well for providing access to contaminated groundwater in an aquifer;

a variable flow rate pump arranged for removal of the contaminated groundwater from the groundwater extraction well;

a monitoring well for providing access to the aquifer, where the monitoring well is spaced from the groundwater extraction well there being no pump located to pump fluid from the monitoring well;

a reference well for providing access to the aquifer, where the reference well is separate from the groundwater extraction well;

a first monitoring device for measuring groundwater parameters within the monitoring well and located therein;

a second monitoring device for measuring groundwater parameters within the reference well; and a controller connected to the first and second monitoring device and to the pump for calculating a flow rate for the pump to remove the contaminated groundwater based on signals received from the first and second monitoring device, and for controlling the flow rate of the pump in accordance with the calculated flow rate.

8. A groundwater recovery system according to claim 7 wherein the pump creates a current capture zone and the reference well is located in an area substantially free from influences of the current capture zone.

9. A groundwater recovery system according to claim 8 wherein the monitoring well is located proximate to the boundary of a predetermined capture zone.

10. A groundwater recovery system according to claim 7 wherein the first monitoring device measures a water pressure above the first monitoring device.

11. A groundwater recovery system according to claim 7 wherein the second monitoring device measures a water pressure above the second monitoring device.

12. A groundwater recovery system according to claim 7 wherein the first monitoring device measures a contaminant concentration within the monitoring well.

13. A groundwater recovery system according to claim 7 wherein the second monitoring device measures a contaminant concentration within the reference well.

14. A groundwater recovery system according to claim 7 wherein the variable flow rate pump is a frequency controlled pump.

15. A groundwater recovery system according to claim 7 wherein the variable flow rate pump is a voltage controlled pump.

16. A groundwater recovery system for recovering contaminated groundwater from an aquifer comprising:

a plurality of groundwater extraction wells for providing access to contaminated groundwater in an aquifer;

a plurality of variable flow rate pumps where at least one variable flow rate pump is located within each groundwater extraction well for removing the contaminated groundwater from the groundwater extraction well, thereby creating a current capture zone;

a plurality of monitoring wells for providing access to the aquifer, where the monitoring wells are spaced from the groundwater extraction wells and where the monitoring wells are located on the boundary of a predetermined capture zone there being no pump located to pump fluid from the monitoring wells;

a plurality of reference wells for providing access to the aquifer, where the reference wells are separate from the groundwater extraction wells and where the reference wells are in a location substantially free from the influence of the current capture zone;

a plurality of first monitoring devices where at least one first monitoring device is located within each monitoring well for measuring groundwater parameters within the monitoring wells;

a plurality of second monitoring devices where at least one second monitoring device is located within each reference well for measuring groundwater parameters within the reference wells;

an analog-to-digital converter connected to each first and second monitoring device to convert analog signals from each first and second monitoring device into digital signals;

a computer connected to the analog-to-digital converter for receiving the digital signals and calculating therefrom a calculated flow rate for each variable flow rate pump to remove the contaminated groundwater; and a digital-to-analog converter connected to the computer and to each variable flow rate pump for converting each calculated flow rate from the computer into analog control signals for controlling the flow rate of each variable flow rate pump.

17. A groundwater recovery system according to claim 16 wherein the first monitoring devices measure water pressure above the first monitoring devices.

18. A groundwater recovery system according to claim 16 wherein the second monitoring devices measures water pressure above the second monitoring devices.

19. A groundwater recovery system according to claim 16 wherein the first monitoring devices measure contaminant concentration within the monitoring wells.

20. A groundwater recovery system according to claim 16 wherein the second monitoring devices measure contaminant concentration within the reference wells.

21. A groundwater recovery system according to claim 16 wherein the variable flow rate pumps are frequency controlled pumps.

22. A groundwater recovery system according to claim 16 wherein the variable flow rate pumps are voltage controlled pumps.

23. A method of controlling a groundwater recovery system for recovering contaminated groundwater from an aquifer comprising the steps of:

removing with a variable flow rate pump at a first flow rate contaminated groundwater from an aquifer through a groundwater extraction well which provides access to the aquifer;

monitoring groundwater parameters within a monitoring well which provides access to the aquifer by using at least one monitoring device located therein where the monitoring well is spaced from the groundwater extraction well there being no pump located to pump fluid from the monitoring well;

computing a second flow rate needed to maintain a predetermined capture zone from the groundwater parameters;

transmitting a control signal to the pump representing the second flow rate; and controlling the flow rate of the pump accordance with the control signal.

24. A method of controlling a groundwater recovery system according to claim 23 wherein the monitoring well is located proximate to the boundary of the predetermined capture zone.

25. A method of controlling a groundwater recovery system according to claim 23 wherein the groundwater parameters include a water pressure above a monitoring device located within the monitoring well.

26. A method of controlling a groundwater recovery system according to claim 23 wherein the groundwater parameters include a contaminant concentration within the monitoring well.

27. A method of controlling a groundwater recovery system according to claim 23 wherein the variable flow rate pump is a frequency controlled pump.

28. A method of controlling a groundwater recovery system according to claim 23 wherein the variable flow rate pump is a voltage controlled pump.

29. A method of controlling a groundwater recovery system for recovering contaminated groundwater from an aquifer comprising the steps of:

removing with a variable flow rate pump at a first flow rate contaminated groundwater from an aquifer through a groundwater extraction well which provides access to the aquifer, thereby creating a capture zone;

monitoring groundwater parameters within at least one monitoring well which provides access to the aquifer, by using at least one monitoring device located respectfully therein where the at least one monitoring well is separate from the groundwater extraction well and where the groundwater parameters are associated with the monitoring well;

computing a second flow rate needed to maintain a predetermined capture zone based on the groundwater parameters for the monitoring well and an equilibrium data for the monitoring well transmitting a control signal to the variable flow rate pump representing the second flow rate; and controlling the flow rate of the variable flow rate pump in accordance with the control signal.

30. A method of controlling a groundwater recovery system according to claim 29 wherein the computing step comprises:

computing for each monitoring well a flow rate needed to maintain a predetermined capture zone based on the groundwater parameters for that monitoring well and an equilibrium data for that monitoring well; and computing a second flow rate based on the flow rate associated with each monitoring well.

31. A method of controlling a groundwater recovery system according to claim 29 wherein the monitoring wells located proximate to the boundary of the predetermined capture zone.

32. A method of controlling a groundwater recovery system according to claim 29 wherein the groundwater parameters include water pressure above a monitoring device located within each monitoring well.

33. A method of controlling a groundwater recovery system according to claim 29 wherein the groundwater parameters include contaminant concentration within the monitoring well.

34. A method of controlling a groundwater recovery system according to claim 29 wherein the variable flow rate pump is a frequency controlled pump.

35. A method of controlling a groundwater recovery system according to claim 29 wherein the variable flow rate pump is a voltage controlled pump.

36. A method of controlling a groundwater recovery system for recovering contaminated groundwater from an aquifer comprising the steps of:

removing with a variable flow rate pump at a first flow rate contaminated groundwater from an aquifer through a groundwater extraction well which provides access to the aquifer, thereby creating a current capture zone;

monitoring monitoring well groundwater parameters within at least one monitoring well which provides access to the aquifer, by using at least one monitoring device located respectfully therein where the at least one monitoring well is spaced from the groundwater extraction well and is associated with the groundwater extraction well;

monitoring reference well groundwater parameters within at least one reference well which provides access to the aquifer, where the reference well is separate from the groundwater extraction well and is associated with the monitoring well;

computing a second flow rate needed to maintain a predetermined capture zone based on the groundwater parameters for the monitoring well and the reference well;

transmitting a control signal to the pump representing the second flow rate; and controlling the flow rate of the pump in accordance with the control signal.

37. A method of controlling a groundwater recovery system according to claim 36 wherein the computing step comprises:

computing an equilibrium data from the reference well groundwater parameters;

computing for the monitoring well a flow rate needed to maintain a predetermined capture zone based on the groundwater parameters for that monitoring well and the equilibrium data;

computing a second flow rate based on the flow rate associated with the monitoring well.

38. A method of controlling a groundwater recovery system according to claim 36 wherein each monitoring well is located proximate to the boundary of the predetermined capture zone.

39. A method of controlling a groundwater recovery system according to claim 36 wherein each reference well is in a location substantially free from the influence of the current capture zone.

40. A method of controlling a groundwater recovery system according to claim 36 wherein the groundwater parameters include water pressure above a respective monitoring device located within each monitoring well.

41. A method of controlling a groundwater recovery system according to claim 36 wherein the groundwater parameters include water pressure above a respective monitoring device located within each reference well.

42. A method of controlling a groundwater recovery system according to claim 36 wherein the groundwater parameters include contaminant concentration within each monitoring well.

43. A method of controlling a groundwater recovery system according to claim 36 wherein the groundwater parameters include contaminant concentration within each reference well.

44. A method of controlling a groundwater recovery system according to claim 36 wherein the variable flow rate pump is a frequency controlled pump.

45. A method of controlling a groundwater recovery system according to claim 36 wherein the variable flow rate pump is a voltage controlled pump.

* * * * *